US009171053B2

(12) United States Patent
Cai et al.

(10) Patent No.: US 9,171,053 B2
(45) Date of Patent: Oct. 27, 2015

(54) METHOD AND DEVICE FOR AUTOMATIC MIGRATION OF SYSTEM CONFIGURATION ITEM

(75) Inventors: Yi Cai, Hangzhou (CN); Yong Wang, Shenzhen (CN); Yuangang Wang, Shenzhen (CN); Qiang Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 662 days.

(21) Appl. No.: 13/565,387

(22) Filed: Aug. 2, 2012

(65) Prior Publication Data
US 2013/0054521 A1    Feb. 28, 2013

Related U.S. Application Data

(63) Continuation of application No. PCT/CN2011/079046, filed on Aug. 29, 2011.

(51) Int. Cl.
G06F 17/30 (2006.01)
H04L 12/24 (2006.01)
(Continued)

(52) U.S. Cl.
CPC .... G06F 17/30578 (2013.01); G06F 17/30067 (2013.01); H04L 41/084 (2013.01); G06F 9/44505 (2013.01); H04L 41/0886 (2013.01); H04L 67/08 (2013.01)

(58) Field of Classification Search
CPC ................... G06F 17/30286; G06F 17/30864; G06F 17/30067; G06F 17/30578
USPC .......... 707/704, 769, 613, 636; 709/222, 223; 719/318
See application file for complete search history.

(56) References Cited

U.S. PATENT DOCUMENTS 6,536,037 B1 *   3/2003   Guheen et al. ................ 717/151
6,615,166 B1 *   9/2003   Guheen et al. .................. 703/27
(Continued)

FOREIGN PATENT DOCUMENTS

CN    101080694 A    11/2007
CN    101222358 A    7/2008
(Continued)

OTHER PUBLICATIONS

Liu et al., "Multi Cloud Management for Unified Cloud Services Across Cloud Sites" Proceedings of IEEE CCIS2011, 2011, 6 pages.
(Continued)

Primary Examiner — Shahid Alam
(74) Attorney, Agent, or Firm — Brinks Gilson & Lione

(57) ABSTRACT

A method and a device for migrating a source system configuration item: collecting through a telnet/ssh protocol channel established with a source system and a predefined shell script corresponding to the source system, a source system configuration item corresponding to a system configuration item identifier, wherein the system configuration item identifier is a predefined system configuration item identifier corresponding to the source system; comparing the collected source system configuration item with a preset default system configuration item to obtain a non-default system configuration item, wherein the non-default system configuration item is regarded as a system configuration item that needs to be migrated; querying a mapping relationship among a pre-system: the system configuration item and a key parameter value to obtain a destination system configuration item and the key parameter value; and performing migration configuration on a destination system through the telnet/ssh protocol channel established with the destination system.

8 Claims, 4 Drawing Sheets

(51) Int. Cl.
*H04L 29/08* (2006.01)
*G06F 9/445* (2006.01)

(56) References Cited

U.S. PATENT DOCUMENTS

| | | |
|---|---|---|
| 6,735,691 B1 | 5/2004 | Capps et al. |
| 2006/0123428 A1* | 6/2006 | Burns .......................... 719/318 |
| 2006/0130052 A1 | 6/2006 | Allen et al. |
| 2008/0104220 A1 | 5/2008 | Vanyukhin et al. |
| 2008/0270515 A1 | 10/2008 | Chen et al. |
| 2009/0216867 A1* | 8/2009 | Pusateri et al. ............... 709/222 |
| 2009/0276771 A1* | 11/2009 | Nickolov et al. ............. 717/177 |
| 2011/0004629 A1 | 1/2011 | Thorat et al. |
| 2011/0131624 A1 | 6/2011 | Wu |

FOREIGN PATENT DOCUMENTS

| | | |
|---|---|---|
| CN | 101281461 A | 10/2008 |
| CN | 101859263 A | 10/2010 |
| CN | 102082684 A | 6/2011 |

OTHER PUBLICATIONS

International Search Report and Written Opinion of the International Searching Authority issued in corresponding PCT Patent Application No. PCT/CN2011/079046, mailed May 31, 2012.

* cited by examiner

METHOD AND DEVICE FOR AUTOMATIC MIGRATION OF SYSTEM CONFIGURATION ITEM

CROSS-REFERENCE TO RELATED APPLICATIONS

This application is a continuation of International Application No. PCT/CN2011/079046, filed on Aug. 29, 2011, which is hereby incorporated by reference in their entireties.

FIELD OF THE INVENTION

Embodiments of the present invention relates to computer technologies, and in particular, to a method and a device for automatic migration of a system configuration item.

BACKGROUND OF THE INVENTION

At present, in market applications of a high-end fault-tolerant computer, smooth migration of a customer application system needs to be ensured, and the risk and workload of customer migration also need to be reduced, so as to achieve the purpose of reducing the total cost of ownership (Total Cost of Ownership, TCO for short) of a customer. Therefore, automation of a migration technology becomes a key point of technical preparation of production of the high-end fault-tolerant computer and embodies achievement of the customer value.

In the prior art, an agent (Agent) is installed on a destination server and a source server. The Agent is used to discover direct system services that are required by application running, and delivers the direct system services to a data model database through an Agent interface. When an application is run in the source server, the Agent set on the source server obtains a direct system service on the source server, and delivers the direct system service to the data model database through the Agent interface. The data model database obtains an indirect system service according to a pre-established dependency relationship between system services and the received direct system service on the source server, and delivers the indirect system service to the Agent on the source server. The Agent on the source server obtains configurations of the direct and the indirect system services according to the direct system service and the indirect system service, and sets the direct system service, the indirect system service, and the configurations of the direct and the indirect system services to the destination server, thereby implementing migration of a system environment depended on by the application from the source server to the destination server.

During the implementation of the present invention, the inventor finds that the prior art at least has the following problems. In the source server and the destination server, the Agent needs to be installed, a test case of each application needs to be written and maintained to collect the direct system service and the indirect system service, and the configurations of the direct and the indirect system services need to be obtained according to the direct system service and the indirect system service, thereby increasing the workload and the risk of the migration.

SUMMARY OF THE INVENTION

Embodiments of the present invention provide a method and a device for automatic migration of a system configuration item, so as to overcome the defects of a heavy work load and a high risk of migration in the prior art.

An embodiment of the present invention provides a method for automatic migration of a system configuration item, which includes:

collecting, through a telnet/ssh protocol channel established with a source system and a predefined shell script that is corresponding to the source system, a source system configuration item that is corresponding to a system configuration item identifier and is on the source system, where the system configuration item identifier is a predefined system configuration item identifier corresponding to the source system;

comparing the collected source system configuration item with a preset default system configuration item corresponding to the source system, to obtain a non-default system configuration item corresponding to the source system, and regarding the non-default system configuration item as a system configuration item that needs to be migrated;

querying a mapping relationship among a pre-system, a system configuration item, and a key parameter value, to obtain a destination system configuration item and a key parameter value that are corresponding to the system configuration item that needs to be migrated; and performing a migration configuration on a destination system through a telnet/ssh protocol channel established with the destination system and according to the destination system configuration item and the key parameter value.

An embodiment of the present invention provides a device for automatic migration of a system configuration item, which includes:

a first channel establishment module, configured to establish a telnet/ssh protocol channel with a source system;

a collection module, configured to collect, through the telnet/ssh protocol channel established by the first channel establishment module and a predefined shell script that is corresponding to the source system, a source system configuration item that is corresponding to a system configuration item identifier and is on the source system, where the system configuration item identifier is a predefined system configuration item identifier corresponding to the source system;

a module for obtaining a system configuration item that needs to be migrated, configured to compare the source system configuration item collected by the collection module with a preset default system configuration item corresponding to the source system, to obtain a non-default system configuration item corresponding to the source system, and regard the non-default system configuration item as a system configuration item that needs to be migrated;

a destination system configuration item and key parameter value obtaining module, configured to query a mapping relationship among a pre-system, a system configuration item, and a key parameter value, to obtain a destination system configuration item and a key parameter value that are corresponding to the system configuration item that needs to be migrated;

a second channel establishment module, configured to establish a telnet/ssh protocol channel with a destination system; and a migration configuration processing module, configured to perform migration configuration on the destination system through the telnet/ssh protocol channel established by the second channel establishment module and according to the destination system configuration item and the key parameter value.

In the method and the device for automatic migration of a system configuration item according to the embodiments of the present invention, a source system configuration item that is corresponding to a system configuration item identifier and is on a source system is collected through a telnet/ssh protocol channel established with the source system and a predefined shell script that is corresponding to the source system; the collected source system configuration item is compared with a preset default system configuration item corresponding to the source system, to obtain a non-default system configuration item corresponding to the source system; and the non-default system configuration item is regarded as a system configuration item that needs to be migrated. A mapping relationship among a pre-system, a system configuration item, and a key parameter value is queried, to obtain a destination system configuration item and a key parameter value that are corresponding to the system configuration item that needs to be migrated, and finally migration configuration is performed on a destination system through the telnet/ssh protocol channel established with the destination system and according to the destination system configuration item and the key parameter value. Thereby, it is implemented that, the source configuration item is automatically obtained, and the automatic migration configuration is completed through the telnet/ssh protocol channel, and further, the defects of a heavy workload and a high risk of migration in the prior art are effectively overcome.

BRIEF DESCRIPTION OF THE DRAWINGS

To illustrate the technical solutions in the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art may further derive other drawings according to these accompanying drawings without creative efforts.

DETAILED DESCRIPTION OF THE EMBODIMENTS

In order to make the objectives, technical solutions, and advantages of the present invention more comprehensible, the technical solutions in the embodiments of the present invention will be clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
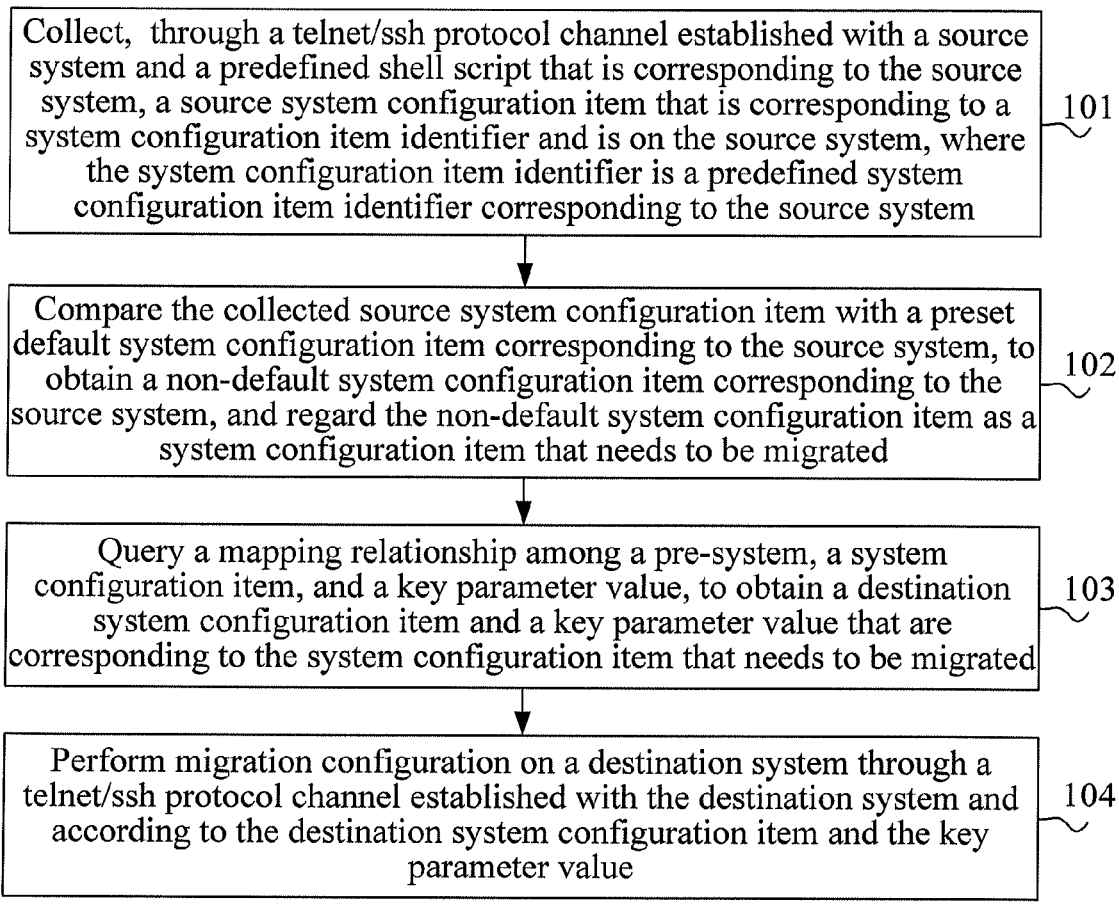
FIG. 1 is a flow chart of an embodiment of a method for automatic migration of a system configuration item according to the present invention.

FIG. 1 is a flow chart of an embodiment of a method for automatic migration of a system configuration item according to the present invention. As shown in FIG. 1, an execution body of this embodiment is a device for automatic migration of a system configuration item. The method includes the following.

Step 101: Collect, through a telecommunication network (Telecommunication network, telnet for short)/secure shell (Secure Shell, ssh for short) protocol channel established with a source system and a predefined shell script that is corresponding to the source system, a source system configuration item that is corresponding to a system configuration item identifier and is on the source system, where the system configuration item identifier is a predefined system configuration item identifier corresponding to the source system.

The source system may be specifically an operating system or a database.

In this embodiment, the device for automatic migration of a system configuration item predefines the system configuration item identifier corresponding to the source system and establishes a connection with the source system through the telnet/ssh protocol, so as to collect, through the telnet/ssh protocol channel and the shell script, the source system configuration item that is corresponding to the system configuration item identifier and is on the source system. The source system configuration item may be specifically a relevant account group, a core parameter, a file system configuration and permission, a system sub-service, a security policy, or a basic software package. It should be noted that, the source system configuration item is not limited to the foregoing content. In addition, one or more collected source system configuration items may exist, and the number of source system configuration item is related to the predefined system configuration item identifier.

Step 102: Compare the collected source system configuration item with a preset default system configuration item corresponding to the source system, to obtain a non-default system configuration item corresponding to the source system, and regard the non-default system configuration item as a system configuration item that needs to be migrated.

In this embodiment, the default system configuration item and the non-default system configuration item may be a relevant account group, a core parameter, a file system configuration and permission, a system sub-service, a security policy, or a basic software package. It should be noted that, the default system configuration item and the non-default system configuration item are not limited to the foregoing content. In addition, the default system configuration item may be a system configuration item corresponding to the source system when the source system is initialized; and the non-default system configuration item may be a system configuration item obtained after the default system configuration item is modified.

Step 103: Query a mapping relationship among a pre-system, a system configuration item, and a key parameter value, to obtain a destination system configuration item and a key parameter value that are corresponding to the system configuration item that needs to be migrated.

In this embodiment, the destination system configuration item may be a relevant account group, a core parameter, a file system configuration and permission, a system sub-service, a security policy, or a basic software package. It should be noted that, the destination system configuration item is not limited to the foregoing content. In addition, for example, when the destination system is a Linux (Red Hat Enterprise Linux, RHEL for short) platform of the Red Hat company and the system configuration item that needs to be migrated is a relevant account group, the key parameter value on the destination system that is corresponding to the system configuration item that needs to be migrated may be specifically: a data line with an id number greater than or equal to 500 in a /etc/passwd file on the RHEL platform.

Step 104: Perform migration configuration on the destination system through a telnet/ssh protocol channel established with the destination system and according to the destination system configuration item and the key parameter value.

In this embodiment, a relationship between the source system and the destination system may be a homogeneous relationship or a heterogeneous relationship.

In this embodiment, a source system configuration item that is corresponding to a system configuration item identifier and is on a source system is collected through a telnet/ssh protocol channel established with the source system and a predefined shell script that is corresponding to the source system; the collected source system configuration item is compared with a preset default system configuration item corresponding to the source system, to obtain a non-default system configuration item corresponding to the source system; and the non-default system configuration item is regarded as a system configuration item that needs to be migrated. A mapping relationship among a pre-system, a system configuration item, and a key parameter value is queried, to obtain a destination system configuration item and a key parameter value that are corresponding to the system configuration item that needs to be migrated, and finally migration configuration is performed on a destination system through a telnet/ssh protocol channel established with the destination system and according to the destination system configuration item and the key parameter value. Thereby, it is implemented that, the source configuration item is automatically obtained, and automatic migration configuration is completed through the telnet/ssh protocol channel, and further, the defects of a heavy workload and a high risk of migration in the prior art are effectively overcome.

Figure 2A:
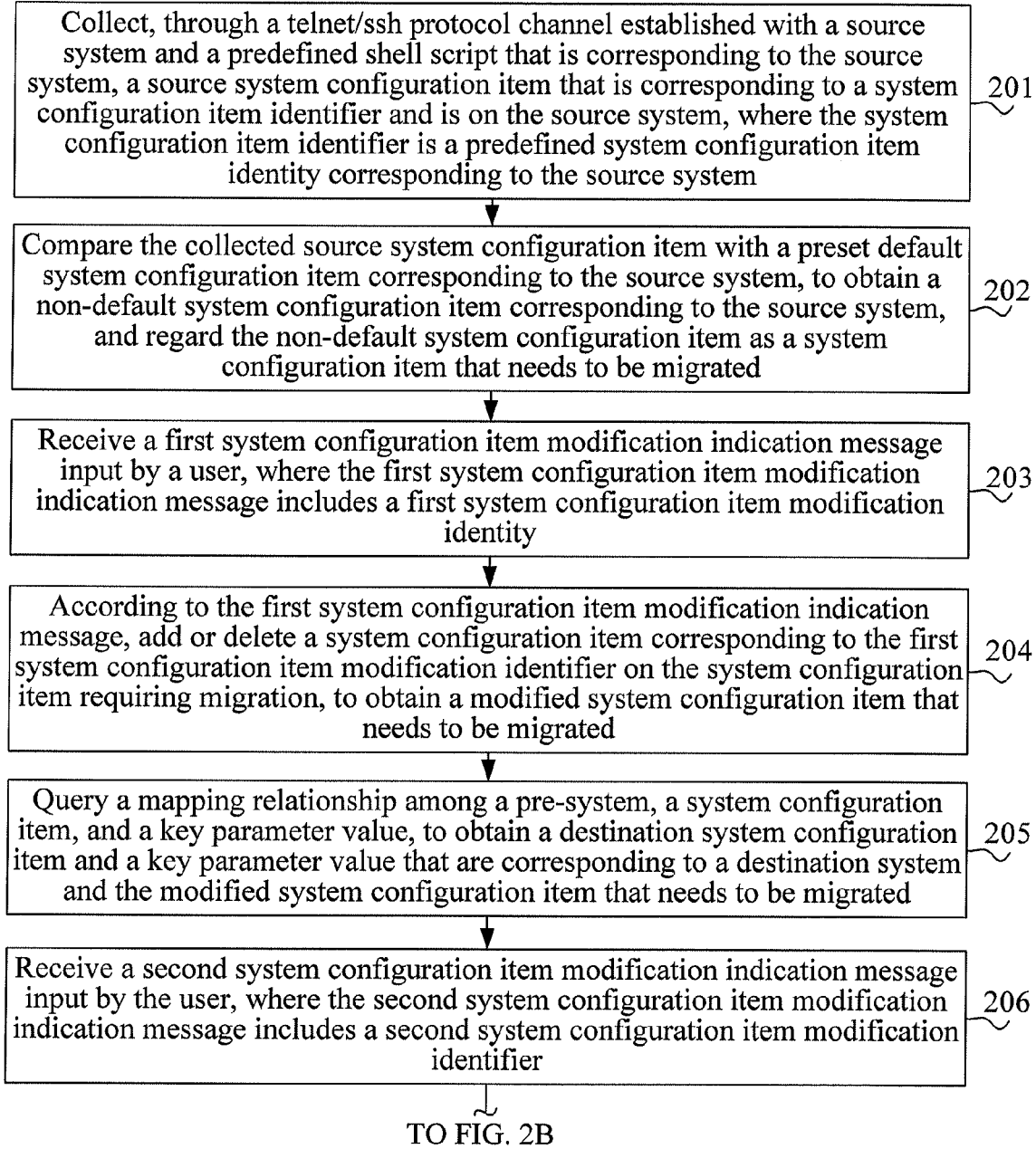
FIGS. 2A and 2B is a flow chart of another embodiment of a method for automatic migration of a system configuration item according to the present invention.
Figure 2B:
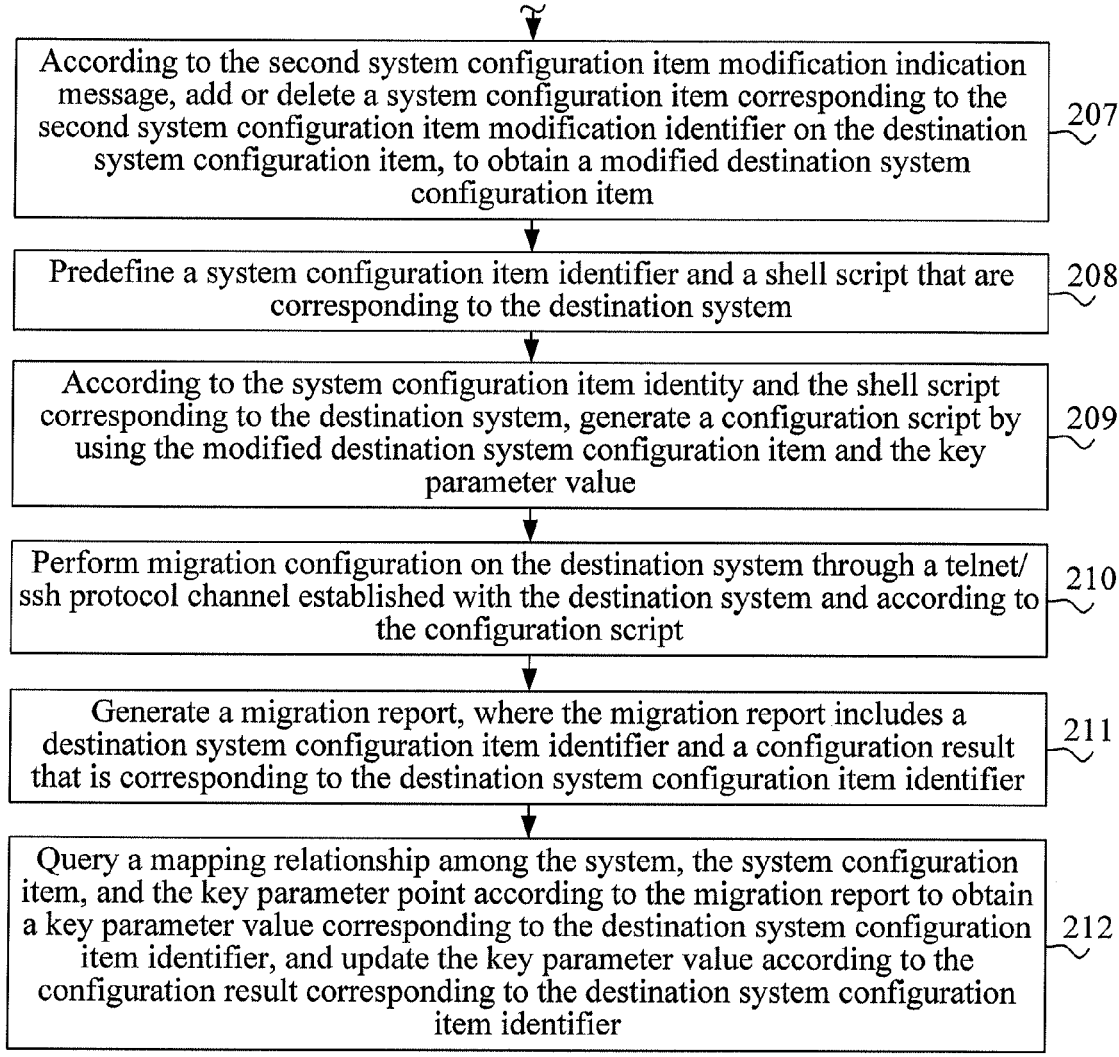

FIG. 2 is a flow chart of another embodiment of a method for automatic migration of a system configuration item according to the present invention. As shown in FIG. 2, an execution body of this embodiment is a device for automatic migration of a system configuration item. The method includes the following.

Step 201: Collect, through a telnet/ssh protocol channel established with a source system and the predefined shell script that is corresponding to a source system, a source system configuration item that is corresponding to a system configuration item identifier and is on the source system, where the system configuration item identifier is a predefined system configuration item identifier corresponding to the source system.

The source system may be specifically an operating system or a database.

In this embodiment, the device for automatic migration of a system configuration item receives a root account and a password that are input by a user through a user interface, performs permission authentication on the root account and the password, and after the permission authentication succeeds, establishes a connection with the source system through the telnet/ssh protocol, so as to collect, through the telnet/ssh protocol channel and the predefined shell script that is corresponding to the source system, the source system configuration item that is corresponding to the system configuration item identifier and is on the source system. The system configuration item identifier is a predefined system configuration item identifier corresponding to the source system. The source system configuration item may be a relevant account group, a core parameter, a file system configuration and permission, a system sub-service, a security policy, or a basic software package. It should be noted that, the source system configuration item is not limited to the foregoing content. In addition, one or more collected source system configuration items may exist, and the number of source system configuration item is related to the predefined system configuration item identifier.

Step 202: Compare the collected source system configuration item with a preset default system configuration item corresponding to the source system, to obtain a non-default system configuration item corresponding to the source system, and regard the non-default system configuration item as a system configuration item that needs to be migrated.

For example, the collected source system configuration items include: a relevant account group, a core parameter, and a system sub-service, respectively. To compare the collected source system configuration items with a default system configuration item of the relevant account group, a default system configuration item of the core parameter, and a default system configuration item of the system sub-service is to compare whether a source system configuration item of the relevant account group, a source system configuration item of the core parameter, and a source system configuration item of the system sub-service are modified with respect to the default system configuration item of the relevant account group, the default system configuration item of the core parameter, and the default system configuration item of the system sub-service; if the source system configuration item of the relevant account group is modified with respect to the default system configuration item of the relevant account group, a modified part is regarded as a non-default system configuration item, and the non-default system configuration item of the relevant account group is regarded as a system configuration item that needs to be migrated.

Step 203: Receive a first system configuration item modification indication message input by a user, where the first system configuration item modification indication message includes a first system configuration item modification identifier.

Step 204: According to the first system configuration item modification indication message, add or delete a system configuration item corresponding to the first system configuration item modification identifier on the system configuration item that needs to be migrated, to obtain a modified system configuration item that needs to be migrated.

Step 205: Query a mapping relationship among a pre-system, a system configuration item, and a key parameter value, to obtain a destination system configuration item and a key parameter value that are corresponding to a destination system and the modified system configuration item that needs to be migrated.

In this embodiment, the destination system configuration item may be a relevant account group, a core parameter, a file system configuration and permission, a system sub-service, a security policy, or a basic software package. It should be noted that, the destination system configuration item is not limited to the foregoing content.

Step 206: Receive a second system configuration item modification indication message input by the user, where the second system configuration item modification indication message includes a second system configuration item modification identifier.

Step 207: According to the second system configuration item modification indication message, add or delete a system configuration item corresponding to the second system configuration item modification identifier on the destination system configuration item, to obtain a modified destination system configuration item.

Step 208: Predefine a system configuration item identifier and a shell script that are corresponding to the destination system.

Step 209: According to the system configuration item identifier and the shell script that are corresponding to the destination system, generate a configuration script by using the modified destination system configuration item and the key parameter value.

Step 210: Perform migration configuration on the destination system through a telnet/ssh protocol channel established with the destination system and according to the configuration script.

In this embodiment, the device for automatic migration of a system configuration item receives the root account and the password that are input by the user through the user interface, performs the permission authentication on the root account and the password, and after the permission authentication succeeds, establishes a connection with the destination system through the telnet/ssh protocol, so as to perform migration configuration on the destination system through the telnet/ssh protocol channel established with the destination system and according to the configuration script.

Step 211: Generate a migration report, where the migration report includes a destination system configuration item identifier and a configuration result that is corresponding to the destination system configuration item identifier.

In this embodiment, the destination system configuration item identifier may include a successfully configured system configuration item identifier and an unsuccessfully configured system configuration item identifier.

Step 212: Query a mapping relationship among the system, the system configuration item, and the key parameter value according to the migration report, to obtain a key parameter value corresponding to the destination system configuration item identifier, and update the key parameter value according to the configuration result corresponding to the destination system configuration item identifier.

In addition, for the unsuccessfully configured system configuration item identifier, migration configuration may be manually performed on a system configuration item corresponding to the unsuccessfully configured system configuration item identifier on the destination system.

Alternatively, as for the unsuccessfully configured system configuration item identifier, the mapping relationship among the system, the system configuration item, and the key parameter value is queried to obtain the destination system configuration item and the key parameter value that are corresponding to the unsuccessfully configured system configuration item identifier, then the configuration script is generated by using the destination system configuration item and the key parameter value according to the system configuration item identifier and the shell script that are corresponding to the destination system, and finally, the migration configuration is performed on the destination system through the telnet/ssh protocol channel established with the destination system and according to the configuration script.

For example, the technical solution of this embodiment is introduced in detail by taking a situation that the source system is AIX6.1 64-bit and the destination system is RHEL5.4 64-bit as an example. Specifically, the device for automatic migration of a configuration item establishes a connection with AIX6.1 through the telnet protocol, and establishes a connection with RHEL5.4 through the ssh protocol. Then, a root account and a password are input through a user interface and permission authentication is performed on the root account and the password. After the authentication succeeds, a source system configuration item that is corresponding to a system configuration item identifier and is on AIX6.1 is collected through a telnet protocol channel, where the system configuration item identifier is a predefined system configuration item identifier corresponding to AIX6.1. Specifically, the collected source system configuration items include: an account group, a core parameter, pv/lv configurations of datavg and rootvg volume groups, a jfs file system and directory permissions, an ftp/dns/ntp/network system sub-service, an account/process/firewall security policy, and a basic OS software package. The collected source system configuration item is compared with a preset default system configuration item corresponding to AIX6.1, to obtain a non-default configuration item corresponding to the source system. For example, a source system configuration item of the account group is root, daemon, bin, sys, adm, uucp, guest, nobodyt, uxedo, oracle, and sshd in /etc/passwd and a default system configuration item of account group is root, daemon, bin, sys, adm, uucp, guest, and nobody in /etc/passwd, so tuxedo, oracle, and sshd in /etc/passwd is regarded as a non-default system configuration item of the account group, and the non-default system configuration item of the account group is then regarded as a system configuration item that needs to be migrated and is of the account group.

The device for automatic migration of a system configuration item provides the configuration item for a user, where the configuration item needs to be migrated. The user may input a first system configuration item modification indication message, where the first system configuration item modification indication message includes a first system configuration item modification identifier. The device for automatic migration of a system configuration item, according to the first system configuration item modification indication message, adds or deletes a system configuration item corresponding to the first system configuration item modification identifier on the system configuration item that needs to be migrated, to obtain a modified system configuration item that needs to be migrated. For example, the first system configuration item modification indication message is a system configuration item deletion indication message, and the system configuration item corresponding to the first system configuration item modification identifier is sshd in /etc/passwd, so sshd in the non-default system configuration item (for example, tuxedo, oracle, and sshd in /etc/passwd) of the account group is deleted, and the obtained modified system configuration item that needs to be migrated and is of the account group is tuxedo and oracle in /etc/passwd.

The device for automatic migration of a system configuration item queries the mapping relationship among the pre-established system, the system configuration item, and the key parameter value, namely, the mapping relationship among the pre-system, the system configuration item, and the key parameter value, to obtain a destination system configuration item and a key parameter value that are corresponding to RHEL5.4 and the modified system configuration item that needs to be migrated; a configuration script that can be executed in sequence in RHEL5.4 is generated by using the destination system configuration item and the key parameter value according to the predefined system configuration item identifier and shell script of RHEL5.4; and migration configuration is performed on RHEL5.4 through the ssh protocol channel and the configuration script.

In this embodiment, a source system configuration item that is corresponding to a system configuration item identifier and is on a source system is collected through a telnet/ssh protocol channel established with the source system; the collected source system configuration item is compared with a preset default system configuration item corresponding to the source system, to obtain a non-default system configuration item corresponding to the source system; and the non-default system configuration item is regarded as a system configuration item that needs to be migrated. A mapping relationship among a pre-system, a system configuration item, and a key parameter value is queried, to obtain a destination system configuration item and a key parameter value that are corresponding to the system configuration item that needs to be migrated, and finally migration configuration is performed on a destination system through a telnet/ssh protocol channel established with the destination system and according to the destination system configuration item and the key parameter value. Thereby, it is implemented that, the source configuration item is automatically obtained on line, and the automatic migration configuration is completed through the telnet/ssh protocol channel, and further, the defects of a heavy workload and a high risk of migration in the prior art are effectively overcome. In addition, the system configuration item that needs to be migrated and the destination system configuration item may be monitored and modified by the user, that is, a controllable security mechanism is established, thereby ensuring the quality of the migration. At the same time, after the migration configuration is completed on the destination system, a migration report may be generated, so that the user not only may clearly know the migration of system configuration items that has been completed and unsuccessfully configured system configuration items, and but also may modify the key parameter value corresponding to the destination system configuration item identifier according to the configuration result corresponding to the destination system configuration item identifier, thereby optimizing the quality of subsequent migration of the same system.

In addition, further, in another embodiment of the present invention, the source system may be a physical machine or a virtual machine, and the destination system may be a virtual machine or a physical machine, and the implementation principle thereof is similar to the implementation principle of the method embodiment shown in FIG. 2 and will not be described here again, thereby supporting migration configuration between a physical machine and a physical machine, migration configuration between a virtual machine and a physical machine, or migration configuration between a virtual machine and a virtual machine, and further satisfying migration requirements in application scenarios.

Figure 3:
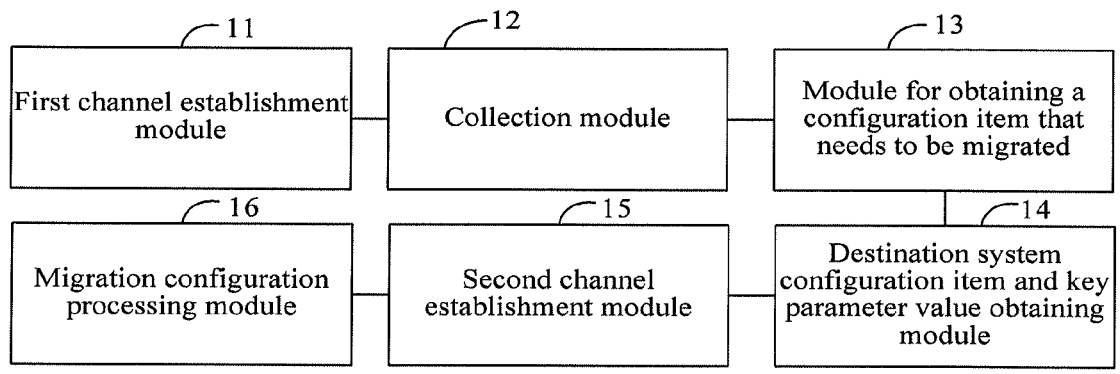
FIG. 3 is a schematic structural diagram of an embodiment of a device for automatic migration of a system configuration item according to the present invention.

FIG. 3 is a schematic structural diagram of an embodiment of a device for automatic migration of a system configuration item according to the present invention. As shown in FIG. 3, the device of this embodiment includes: a first channel establishment module 11, a collection module 12, a module 13 for obtaining a system configuration item that needs to be migrated, a destination system configuration item and key parameter value obtaining module 14, a second channel establishment module 15, and a migration configuration processing module 16. The first channel establishment module 11 is configured to establish a telnet/ssh protocol channel with a source system. The collection module 12 is configured to collect, through the telnet/ssh protocol channel established by the first channel establishment module 11 and a predefined shell script that is corresponding to the source system, a source system configuration item that is corresponding to a system configuration item identifier and is on the source system, where the system configuration item identifier is a predefined system configuration item identifier corresponding to the source system. The module 13 for obtaining a system configuration item that needs to be migrated is configured to compare the source system configuration item collected by the collection module 12 with a preset default system configuration item corresponding to the source system, to obtain a non-default system configuration item corresponding to the source system, and regard the non-default system configuration item as a system configuration item that needs to be migrated. The destination system configuration item and key parameter value obtaining module 14 is configured to query a mapping relationship among a pre-system, a system configuration item, and a key parameter value, to obtain a destination system configuration item and a key parameter value that are corresponding to the system configuration item that needs to be migrated. The second channel establishment module 15 is configured to establish a telnet/ssh protocol channel with a destination system. The migration configuration processing module 16 is configured to perform migration configuration on the destination system through the telnet/ssh protocol channel established by the second channel establishment module 15 and according to the destination system configuration item and the key parameter value.

The device for automatic migration of a system configuration item according to this embodiment may execute the technical solution of the method embodiment shown in FIG. 1, and the implementation principle thereof is similar to that of the method embodiment shown in FIG. 1 and will not be described here again.

In this embodiment, a source system configuration item that is corresponding to a system configuration item identifier and is on a source system is collected through a telnet/ssh protocol channel established with the source system and a predefined shell script that is corresponding to the source system; the collected source system configuration item is compared with a preset default system configuration item corresponding to the source system, to obtain a non-default system configuration item corresponding to the source system; and the non-default system configuration item is regarded as a system configuration item that needs to be migrated. A mapping relationship among a pre-system, a system configuration item, and a key parameter value is queried, to obtain a destination system configuration item and a key parameter value that are corresponding to the system configuration item that needs to be migrated, and migration configuration is performed on a destination system through a telnet/ssh protocol channel established with the destination system and according to the destination system configuration item and the key parameter value. Thereby, it is implemented that, the source configuration item is automatically obtained, and the automatic migration configuration is completed through the telnet/ssh protocol channel, and further, the defects of a heavy workload and a high risk of migration in the prior art are effectively overcome.

Figure 4:
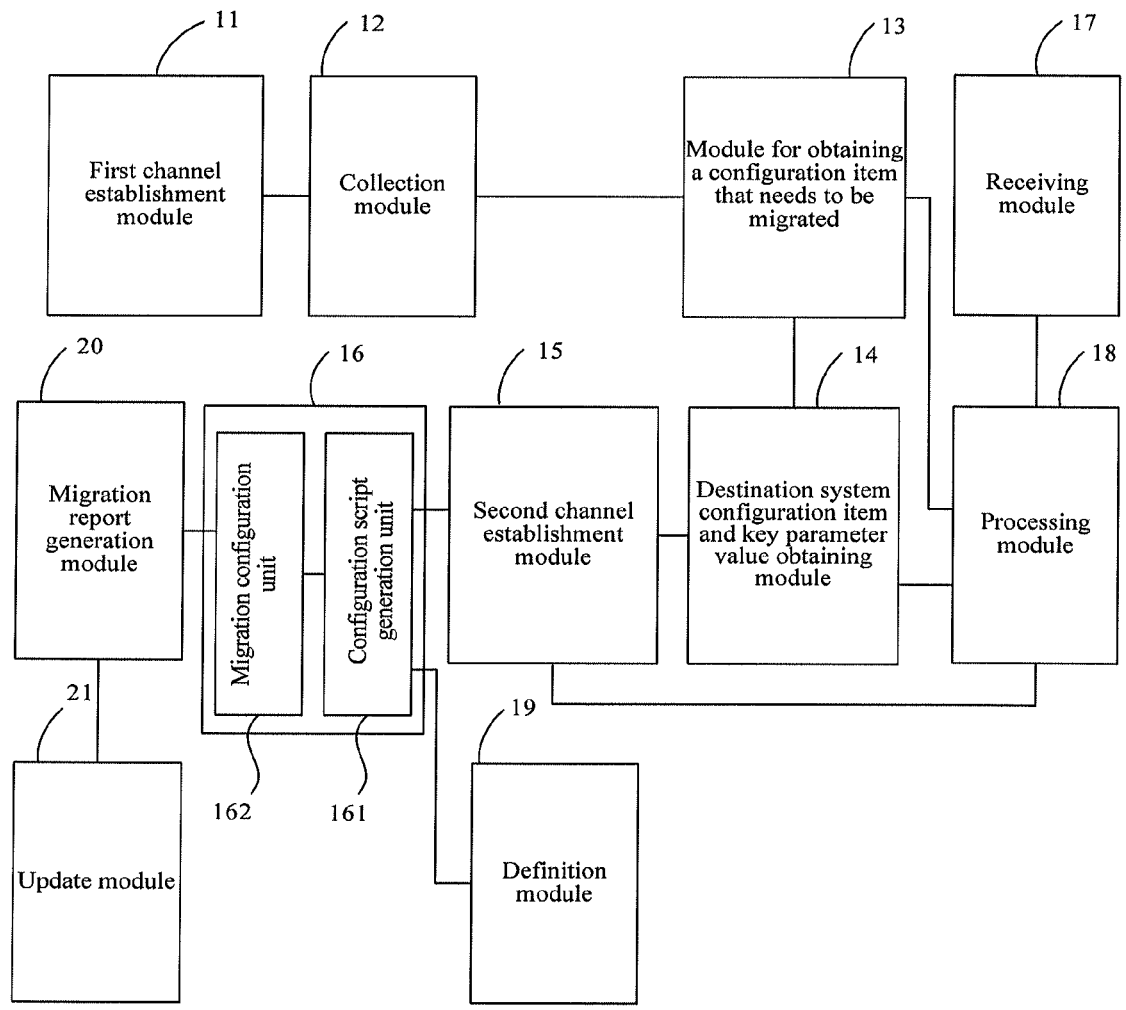
FIG. 4 is a schematic structural diagram of another embodiment of a device for automatic migration of a system configuration item according to the present invention.

FIG. 4 is a schematic structural diagram of another embodiment of a device for automatic migration of a system configuration item according to the present invention. On the basis of the embodiment shown in FIG. 3, as shown in FIG. 4, the device of this embodiment further includes: a receiving module 17 and a processing module 18. The receiving module 17 is configured to receive a first system configuration item modification indication message that are input by a user, where the first system configuration item modification indication message includes a first system configuration item modification identifier. The processing module 18 is configured to, according to the first system configuration item modification indication message, add or delete a system configuration item corresponding to the first system configuration item modification identifier on the system configuration item that needs to be migrated, to obtain a modified system configuration item that needs to be migrated. The destination system configuration item and key parameter value obtaining module 14 is specifically configured to query the mapping relationship among the pre-system, the system configuration item and the key parameter value, to obtain a destination system configuration item and a key parameter value that are corresponding to the modified system configuration item that needs to be migrated.

Further, the receiving module 17 is further configured to receive a second system configuration item modification indication message input by the user, where the second system configuration item modification indication message includes a second system configuration item modification identifier. The processing module 18 is further configured to add or delete a system configuration item corresponding to the second system configuration item modification identifier on the destination system configuration item according to the second system configuration item modification indication message, to obtain a modified destination system configuration item. The migration configuration processing module 16 is specifically configured to perform the migration configuration on the destination system through the telnet/ssh protocol channel established with the destination system and according to the modified destination system configuration item and the key parameter value.

Further, the device further includes: a definition module 19, configured to predefine a system configuration item identifier and a shell script that are corresponding to the destination system.

Accordingly, the migration configuration processing module 16 includes a configuration script generation unit 161 and a migration configuration unit 162. The configuration script generation unit 161 is configured to generate a configuration script by using the destination system configuration item and the key parameter value according to the system configuration item identifier and the shell script that are corresponding to the destination system. The migration configuration unit 162 is configured to perform the migration configuration on the destination system through the telnet/ssh protocol channel established with the destination system and according to the configuration script.

Further, the device further includes: a migration report generation module 20 and an update module 21. The migration report generation module 20 is configured to generate a migration report, where the migration report includes a destination system configuration item identifier and a configuration result that is corresponding to the destination system configuration item identifier. The update module 21 is configured to query a relationship among the system, the system configuration item, and the key parameter value according to the migration report, to obtain a key parameter value corresponding to the destination system configuration item identifier, and update the key parameter value according to the configuration result corresponding to the destination system configuration item identifier.

The device for automatic migration of a system configuration item according to this embodiment may execute the technical solution of the method embodiment shown in FIG. 2, and the implementation principle thereof is similar to that of the method embodiment shown in FIG. 2 and will not be described here again.

In this embodiment, a source system configuration item that is corresponding to a system configuration item identifier and is on a source system is collected through a telnet/ssh protocol channel established with the source system; the collected source system configuration item is compared with a preset default system configuration item corresponding to the source system, to obtain a non-default system configuration item corresponding to the source system; and the non-default system configuration item is regarded as a system configuration item that needs to be migrated. A mapping relationship among a pre-system, a system configuration item, and a key parameter value is queried, to obtain a destination system configuration item and a key parameter value that are corresponding to the system configuration item that needs to be migrated, and finally migration configuration is performed on a destination system through a telnet/ssh protocol channel established with the destination system and according to the destination system configuration item and the key parameter value. Thereby, it is implemented that, the source configuration item is automatically obtained on line, and the automatic migration configuration is completed through the telnet/ssh protocol channel, and further, the defects of a heavy workload and a high risk of migration in the prior art are effectively overcome. In addition, the system configuration item that needs to be migrated and the destination system configuration item may be monitored and modified by the user, that is, a controllable security mechanism is established, thereby ensuring the quality of the migration. At the same time, after the migration configuration is completed on the destination system, a migration report may be generated, so that the user not only can clearly know the migration of system configuration items that has been completed and unsuccessfully configured system configuration items, and but also may modify the key parameter value corresponding to the destination system configuration item identifier according to the configuration result corresponding to the destination system configuration item identifier, thereby optimizing the quality of subsequent migration of the same system.

Persons of ordinary skill in the art may understand that, all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, or an optical disk.

The apparatus embodiments in the foregoing description are merely exemplary. Units described as separate components may be or may not be physically separated. Components shown as units may be or may not be physical units, that is, may be located in one place or distributed to at least two network units. Some or all of the modules may be selected to achieve the objective of the solution of the embodiment according to actual demands. Persons of ordinary skill in the art may understand and implement the present invention without creative efforts.

Finally, it should be noted that, the above embodiments are merely provided for describing the technical solutions of the present invention, but not intended to limit the present invention. It should be understood by persons of ordinary skill in the art that, although the present invention has been described in detail with reference to the embodiments, modifications may still be made to the technical solutions described in the embodiments, or equivalent replacements may still be made to some technical features in the technical solutions, and such modifications or replacements do not cause the essence of corresponding technical solutions to depart from the spirit and scope of the present invention.

What is claimed is:

1. A method for migration of a system configuration item performed by a computer having a nontransitory storage medium with an executable program stored therein, the program instructing the computer to perform the method comprising:

collecting, through a telecommunication network/secure shell protocol channel established with a source system and a predefined shell script that is corresponding to the source system, a source system configuration item that is corresponding to a system configuration item identifier and is on the source system;

obtaining a non-default system configuration item corresponding to the source system by comparing the collected source system configuration item with a preset default system configuration item corresponding to the source system, the non-default system configuration item corresponding to the source system is a system configuration item that needs to be migrated;

receiving a first system configuration item modification indication message, wherein the first system configuration item modification indication message comprises a first system configuration item modification identifier;

obtaining a modified system configuration item that needs to be migrated according to the first system configuration item modification indication message by adding or deleting the system configuration item that needs to be migrated; querying a mapping relationship among a pre-system, a system configuration item, and a key parameter value, to obtain a destination system configuration item and a key parameter value that are corresponding to the modified system configuration item that needs to be migrated; and performing migration configuration on a destination system through a telecommunication network/secure shell protocol channel established with the destination system and according to the destination system configuration item and the key parameter value.

2. The method for automatic migration of the system configuration item according to claim 1, further comprising:

receiving a second system configuration item modification indication message input by the user, wherein the second system configuration item modification indication message comprises a second system configuration item modification identifier; and according to the second system configuration item modification indication message, adding or deleting a system configuration item corresponding to the second system configuration item modification identifier on the destination system configuration item, to obtain a modified destination system configuration item, wherein the performing the migration configuration on the destination system through the telecommunication network/secure shell protocol channel established with the destination system and according to the destination system configuration item and the key parameter value comprises:

performing the migration configuration on the destination system through the telecommunication network/secure shell protocol channel established with the destination system and according to the modified destination system configuration item and the key parameter value.

3. The method for automatic migration of the system configuration item according to claim 1, further comprising:

generating a migration report, wherein the migration report comprises a destination system configuration item identifier and a configuration result that is corresponding to the destination system configuration item identifier; and querying a mapping relationship among the system, the system configuration item, and the key parameter value according to the migration report, to obtain a key parameter value corresponding to the destination system configuration item identifier, and updating the key parameter value according to the configuration result corresponding to the destination system configuration item identifier.

4. A method for migration of a system configuration item performed by a computer having a nontransitory storage medium with an executable program stored therein, the program instructing the computer to perform the method comprising:

collecting, through a telecommunication network/secure shell protocol channel established with a source system and a predefined shell script that is corresponding to the source system, a source system configuration item that is corresponding to a system configuration item identifier and is on the source system;

obtaining a non-default system configuration item corresponding to the source system by comparing the collected source system configuration item with a preset default system configuration item corresponding to the source system, the non-default system configuration item corresponding to the source system is a system configuration item that needs to be migrated;

querying a mapping relationship among a pre-system, a system configuration item, and a key parameter value, to obtain a destination system configuration item and a key parameter value that are corresponding to the system configuration item that needs to be migrated, wherein the mapping relationship among a pre-system, a system configuration item, and a key parameter value is a mapping relationship among a pre-established system, a system configuration item, and a key parameter value;

predefining a system configuration item identifier and a shell script that are corresponding to the destination system;

generating a configuration script by using the destination system configuration item and the key parameter value according to the system configuration item identifier and the shell script that are corresponding to the destination system; and performing the migration configuration on the destination system through the telecommunication network/secure shell protocol channel established with the destination system and according to the configuration script.

5. A device for migration of a system configuration item, comprising a computer having a nontransitory storage medium with an executable program stored therein, the program when executed configuring the computer to comprise:

a first channel establishment module, configured to establish a telecommunication network/secure shell protocol channel with a source system;

a collection module, configured to collect, through the telecommunication network/secure shell protocol channel established by the first channel establishment module and a predefined shell script that is corresponding to the source system, a source system configuration item that is corresponding to a system configuration item identifier and is on the source system;

a module for obtaining a system configuration item that needs to be migrated, configured to obtain a non-default system configuration item corresponding to the source system by comparing the source system configuration item collected by the collection module with a preset default system configuration item corresponding to the source system, the non-default system configuration item corresponding to the source system is a system configuration item that needs to be migrated;

a destination system configuration item and key parameter value obtaining module, configured to query a mapping relationship among a pre-system, a system configuration item, and a key parameter value, to obtain a destination system configuration item and a key parameter value that are corresponding to the system configuration item that needs to be migrated, wherein the mapping relationship among a pre-system, a system configuration item, and a key parameter value is a mapping relationship among a pre-established system, a system configuration item, and a key parameter value;

a second channel establishment module, configured to establish a telecommunication network/secure shell protocol channel with a destination system;

a migration configuration processing module, configured to perform migration configuration on the destination system through the telecommunication network/secure shell protocol channel established by the second channel establishment module and according to the destination system configuration item and the key parameter value;

a receiving module, configured to receive a first system configuration item modification indication message input by a user, wherein the first system configuration item modification indication message comprises a first system configuration item modification identifier; and a processing module, configured to, according to the first system configuration item modification indication message, add or delete a system configuration item corresponding to the first system configuration item modification identifier on the system configuration item that needs to be migrated, to obtain a modified system configuration item that needs to be migrated, wherein the module for obtaining a system configuration item that needs to be migrated is further configured to query the mapping relationship among the pre-system, the system configuration item, and the key parameter value, to obtain a destination system configuration item and a key parameter value that are corresponding to the modified system configuration item that needs to be migrated.

6. The device for automatic migration of the system configuration item according to claim 5, wherein the receiving module is further configured to receive a second system configuration item modification indication message input by the user, wherein the second system configuration item modification indication message comprises a second system configuration item modification identifier;

the processing module is further configured to, according to the second system configuration item modification indication message, add or delete a system configuration item corresponding to the second system configuration item modification identifier on the destination system configuration item, to obtain a modified destination system configuration item; and the migration configuration processing module is specifically configured to perform the migration configuration on the destination system through the telecommunication network/secure shell protocol channel established with the destination system and according to the modified destination system configuration item and the key parameter value.

7. The device for automatic migration of the system configuration item according to claim 5, further comprising:

a migration report generation module, configured to generate a migration report, wherein the migration report comprises a destination system configuration item identifier and a configuration result that is corresponding to the destination system configuration item identifier; and an update module, configured to query a mapping relationship among the system, the system configuration item, and the key parameter value according to the migration report to obtain a key parameter value corresponding to the destination system configuration item identifier, and update the key parameter value according to the configuration result corresponding to the destination system configuration item identifier.

8. A device for migration of a system configuration item, comprising a computer having a nontransitory storage medium with an executable program stored therein, the program when executed configuring the computer to comprise:

a first channel establishment module, configured to establish a telecommunication network/secure shell protocol channel with a source system;

a collection module, configured to collect, through the telecommunication network/secure shell protocol channel established by the first channel establishment module and a predefined shell script that is corresponding to the source system, a source system configuration item that is corresponding to a system configuration item identifier and is on the source system;

a module for obtaining a system configuration item that needs to be migrated, configured to obtain a non-default system configuration item corresponding to the source system by comparing the source system configuration item collected by the collection module with a preset default system configuration item corresponding to the source system, the non-default system configuration item corresponding to the source system is a system configuration item that needs to be migrated;

a destination system configuration item and key parameter value obtaining module, configured to query a mapping relationship among a pre-system, a system configuration item, and a key parameter value, to obtain a destination system configuration item and a key parameter value that are corresponding to the system configuration item that needs to be migrated, wherein the mapping relationship among a pre-system, a system configuration item, and a key parameter value is a mapping relationship among a pre-established system, a system configuration item, and a key parameter value;

a second channel establishment module, configured to establish a telecommunication network/secure shell protocol channel with a destination system;

a definition module, configured to predefine a system configuration item identifier and a shell script that are corresponding to the destination system;

a configuration script generation unit, configured to, according to the system configuration item identifier and the shell script that are corresponding to the destination system, generate a configuration script by using the destination system configuration item and the key parameter value; and a migration configuration unit, configured to perform the migration configuration on the destination system through the telecommunication network/secure shell protocol channel established with the destination system and according to the configuration script.

* * * * *